UNITED STATES PATENT OFFICE.

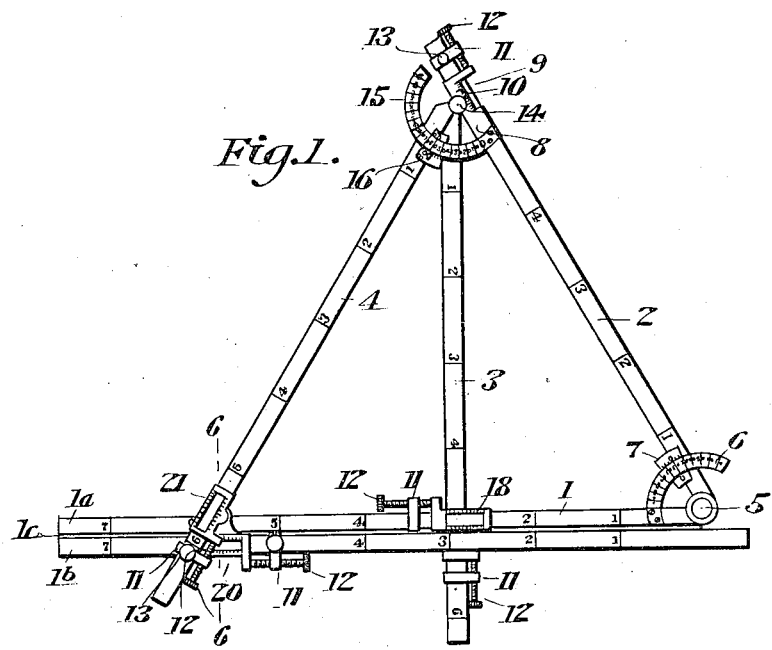

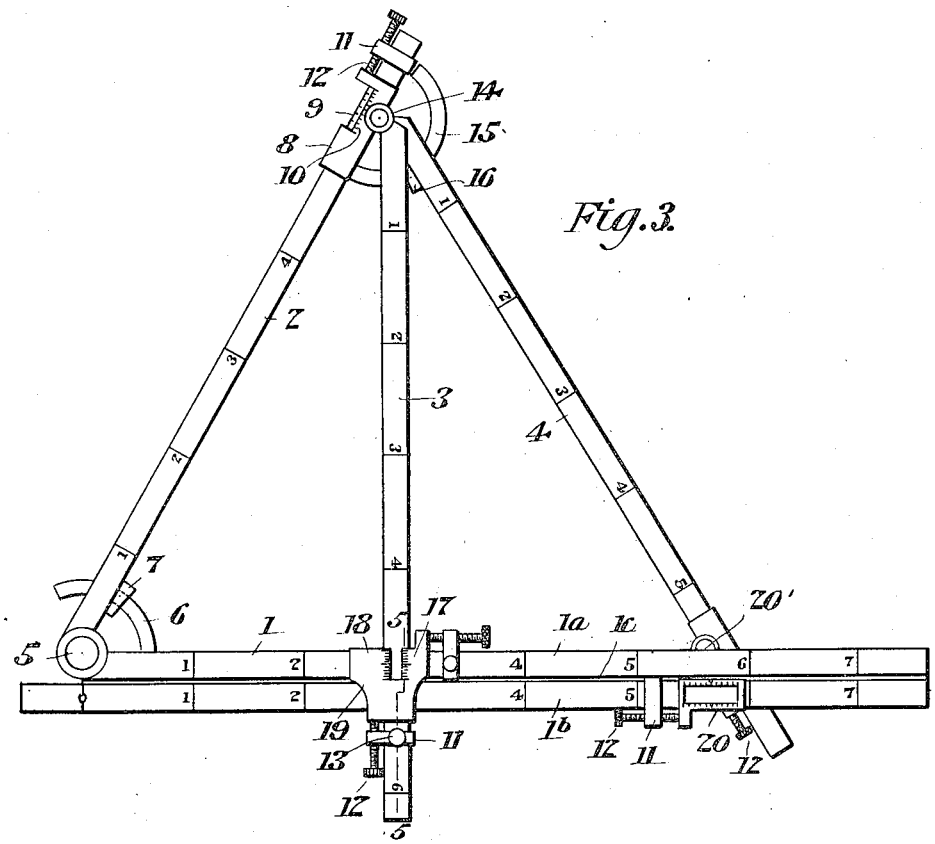
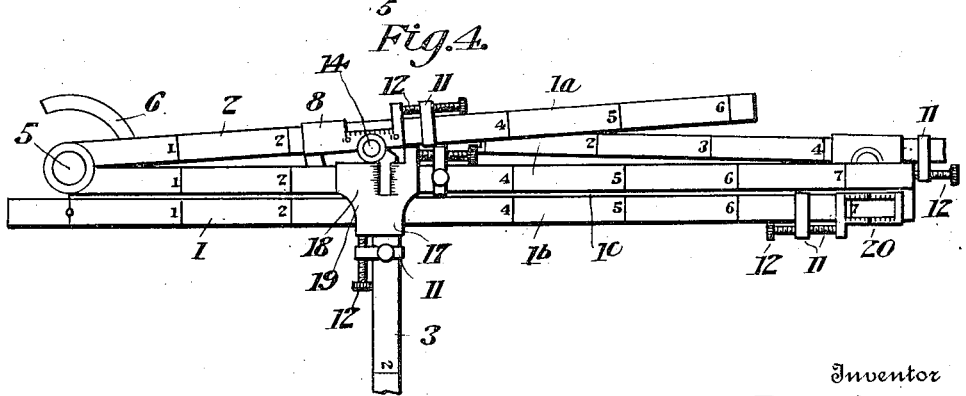

EDWARD L. RENSTROM, OF GULCH, COLORADO.

MEASURING INSTRUMENT.

1,268,620.	Specification of Letters Patent.	Patented June 4, 1918.

Application filed April 4, 1917, Serial No. 159,750. Renewed April 10, 1918. Serial No. 227,820.

*To all whom it may concern:*

Be it known that I, EDWARD L. RENSTROM, a citizen of the United States, residing at Gulch, in the county of Pitkin and State of Colorado, have invented new and useful Improvements in Measuring Instruments, of which the following is a specification.

This invention relates to an instrument adapted particularly for engineers' use and designed to mechanically determine the known angles or linear dimension of a triangle by adjusting the instrument in accordance with the known dimensions.

The present invention relates particularly to an improvement upon the type of measuring instrument shown in my prior Patent No. 1,149,085, dated Aug. 3, 1915, the object of the invention being to provide certain improvements in the construction of such instrument, whereby the instrument is rendered adaptable also for measuring the smallest dimensions of right angle triangles and oblique triangles.

The invention consists of the features of construction combination and arrangement of parts herein fully described and claimed, reference being had to the accompanying drawings in which:—

Figure 1 is a plan view of a measuring instrument embodying my invention.

Fig. 2 is a view showing the adjustment of the instrument for measuring the dimensions of acute angled triangles.

Fig. 3 is a plan view of a measuring instrument of the side opposite to that shown in Fig. 1.

Fig. 4 is an edge view of the instrument with parts in folded condition.

Figs. 5 and 6 are sections on the lines 5—5 of Fig. 3 and 6—6 of Fig. 1, respectively.

Referring particularly to the accompanying drawings, my instrument is made up of a plurality of bar-like sections 1, 2, 3 and 4, preferably of ruler-like formation and graduated on the opposite surfaces to indicate feet, inches, or any other basic measurements, the bar 1 being formed of duplicate members $1^a$ and $1^b$, connected by an intervening reduced web $1^c$. The bar member $1^a$ of the section 1 is pivotally connected at 5 with the section 2 to provide for the relative adjustment of these sections in any desired angular relation, and the section 1 preferably carries a protractor scale 6 while the section 2 carries an ordinary vernier scale 7 whereby the angular relation of the sections 1 and 2 may be accurately determined.

Slidably mounted upon the section 2 is a sleeve-like member 8 formed with a longitudinally extending slot 9 through which the graduations of the section 2 may be read, the edges of the slot being preferably graduated at 10 with minute graduations of the scale measurements indicated on the section 2. A band 11 is also slidably mounted upon the section 2 and is connected with the sleeve 8 by an adjusting screw 12, a clamping screw 13 passing through the band 11 and engaging the section 2. This provides a simple type of adjusting means, it being obvious that the sleeve 8 may be adjusted longitudinally of the section 2 to coincide generally with any particular scale mark on the section, and after fixing the sleeve with relation to the section 2 by means of the set screw 13 a completely accurate adjustment of the sleeve may be secured through the screw 12. This type of adjustment is well known in various instruments and no specific novelty is alleged herein for such device, it being understood that in operation any micrometer adjustment may be used as desired.

The pivot member 14 connected to the sleeve 8 and independently mounted on such pivot member are the terminals of sections 3 and 4 of the instrument. The sections 3 and 4 are preferably connected to the pivot member in superimposed relation longitudinally of said member, and the sleeve 8 carries a protractor scale 15 coöperating with a vernier 16 secured on the section 4, whereby accurate angular adjustment of the section 4 with relation to the section 2 is secured. The section 3 passes through an adjusting sleeve 17 similar in general respects to the sleeve 8, while the bar or member $1^a$ of the section 1 passes through a sleeve 18 similar to the sleeves 8 and 17, said sleeves 17 and 18 however, being through the medium of a web 19 connected in rigid relation, that is in exact right angular relation.

The sleeve 18, as will be observed, is open at its base to engage only the bar or member $1^a$ of the section 1, and has inturned edges which engage the guide grooves in the sides of the section 1 formed by the reduced connecting web $1^c$. The bar or member section $1^b$ is slidably mounted in a sleeve 20, while the section 4 is slidably mounted in a sleeve 21 similar in all respects to the sleeves 8 and 17, and to which the sleeve 20 is pivotally connected, as indicated at 20'. It is of course understood that each sleeve member 8, 17, 18, 20 and 21 has sliding coöperation with one section only, or with duplicate members of a double section, as in case of the section 1, and that so far as each section is concerned with relation to the sleeves 17, 18 and 21 it will be evident that any of these sleeves may be clamped to its bar and subsequently adjusted with accuracy by the adjusting screw. The sleeve 18 connects the section 1 for such adjustments with the section 3, but slidably engages only the bar or member 1 of said section, while the sleeve 20, which is without independent adjustment, slidably and pivotally connects the section 1, with the section 4 but engages only the bar or member $1^b$ of section 1, as will be clearly understood. By this construction it will be observed that the section 4 is slidably connected with the section 1 through the medium of the sleeve 20 so that it may be swung in opposite directions past the section 3 toward and from and at different angular relations to the section 2 without interference from the sleeve 18, since the sleeves 18 and 20 are arranged in different but parallel planes.

In the use of the instrument, for example, it being desired to find the remaining angles and linear dimensions of a triangle of which two sides and the included angle is known, the device is set by adjusting the sleeves 8 and 21 in accordance with the known dimensions of two sides of the triangle and clamping the sleeves in this adjustment. Then upon angularly adjusting the section 2 with relation to section 1 the given angle is indicated on the scale 6, the movement of the section 2 being secured by moving the section 4 through the sleeve 21 toward the sleeve 8. The precise adjustment is obtained by the use of the adjusting screw of the sleeve 21 as previously described. Now by adding the angular degrees indicated on the scales 6 and 15 between the sections 1 and 2 and 2 and 4 and subtracting the same from 180° will give as a result the third angle, while the indicated length of the section 4 on the reading line of sleeve 21 will give the linear dimension of the third side. The protractor scale 6 is used when the included known angle is less than 90°, while the scale 15 is used when such angle is greater than 90°. When two known angles and the included side are given, section 2 or rather the sleeve 8 thereon, is adjusted to indicate the length of the known side. One of the known angles is then arranged on the scale 6 by adjustment of the section 4 as previously described. Having one of the known angles indicated on the scale 6, the sleeves 17 and 18 are then clamped to the respective sections 1 and 3, thereby fixing the angular relation of the sections 1 and 2. Section 4 is then adjusted longitudinally of section 1 until the scale 15 indicates the other known angle, and clamped in place. The sum of the angles between the sections 1 and 2 and between sections 2 and 4, subtracted from 180°, will thereupon give the unknown angle while the linear dimensions of sections 1 and 4 will give the unknown sides.

In measuring the unknown angles and linear dimensions of acute triangles down to the smallest degree, it will be understood that the section 4 is moved past the section 3 toward the section 2, through the sliding of the sleeve 20 on the member $1^b$ of the section 1, which will allow the bar 4 to be adjusted without interference from the sleeve 18 for a degree of movement clear up to the section 2, as shown in Fig. 4, the instrument thus being adapted for measuring right angled, acute angled and obtuse angled triangles in a ready and convenient manner.

With three sides given the respective dimensions are set out on the sections 1, 2 and 4 and the angular relation of the respective sections determined in an obvious manner. With the use of section 3 the unknown linear dimension or dimensions of right angle triangles may be readily determined in an obvious manner.

In the use of the instrument mathematical computations ordinarily necessary to determine the unknown dimensions together with the time and labor required in such computations is avoided as the instrument will mechanically find the unknown dimension under all conditions where it is possible to determine such unknown dimensions mathematically from the known dimensions.

The respective beam sections 1, 2, 3, 4 may be constructed in any sectional area, of any length, or of any material, and no limitation is contemplated in this particular.

If desired the pivot member 5 may have a central transparent section in which appears the usual centering cross lines, enabling the sections 1 and 2 with the scale 6 to be used as an ordinary protractor.

The inside edge of each beam should pass exactly through the center of each joint to which they are connected, so as to give a perfect point of angle, or apex of angle, and the zeros of each graduated scale should be put directly above the center of each joint they are attached to. The rigid 90° angle should be put outside or under the main beam so as to give measurement to the most acute or obtuse angles. The perpendicular or center beam should be so made that it can be detached quickly, so that the instrument can be folded and be put in a case specially made for it, which can be carried in the pocket.

I claim:—

1. An instrument of the class described comprising three scale beams arranged in triangulating relation and movably connected, and a fourth beam movably connected at the apex of the triangularly related beams, said fourth beam and one of the first-named beams having independent and non-interfering slidable connection on and with another of the first-named beams.

2. An instrument of the class described comprising a main beam, a pair of other beams pivotally connected at one end to each other, and one of said pair of beams being pivotally connected at its opposite end to the main beam, a slidable pivotal connection between the other end of the other of said pair of beams and the main beam, and a fourth beam pivoted at the angle of intersection of the pair of beams and slidably and pivotally connected with the main beam, said slidable connections being arranged to pass each other without interference.

3. An instrument of the character described comprising a base beam composed of longitudinally spaced portions, a second beam pivoted at one end to one end of one of said portions, a third beam pivotally and slidably connected at one end with the opposite end of the second beam and pivotally and slidably connected at its opposite end with the other section of the main beam, and a fourth beam pivoted at one end at the angle of intersection of the second and third beams and slidably connected with the first-named section of the main beam, the said slidable connections between the third and fourth beams and the main beam being movable past each other without interference.

In testimony whereof I affix my signature.

EDWARD L. RENSTROM.